United States Patent [19]

Kanesaki et al.

[11] Patent Number: 4,680,217

[45] Date of Patent: Jul. 14, 1987

[54] POLYESTER FILM FOR MAGNETIC RECORDING MEDIA

[75] Inventors: Tateo Kanesaki, Nagahama; Shigeo Utsumi, Yokohama; Kichinojyo Tomitaka, Kawasaki, all of Japan

[73] Assignee: Diafoil Company, Limited, Tokyo, Japan

[21] Appl. No.: 914,582

[22] Filed: Oct. 3, 1986

Related U.S. Application Data

[63] Continuation of Ser. No. 818,920, Jan. 15, 1986, abandoned, which is a continuation of Ser. No. 599,333, Apr. 12, 1984.

[30] Foreign Application Priority Data

May 2, 1983 [JP] Japan .................................. 58-77928

[51] Int. Cl.$^4$ .............................................. G11B 5/70
[52] U.S. Cl. .................................... 428/141; 428/147; 428/330; 428/338; 428/409; 428/480; 428/694; 428/900
[58] Field of Search ............... 428/330, 338, 141, 409, 428/147, 480, 694, 900; 523/181; 524/116, 130, 135, 136; 528/398

[56] References Cited

U.S. PATENT DOCUMENTS

| | | | |
|---|---|---|---|
| 4,304,807 | 12/1981 | Kawakami et al. | 428/150 |
| 4,338,367 | 7/1982 | Kawakami et al. | 428/141 |
| 4,348,446 | 9/1982 | Mitsuishi et al. | 428/328 |
| 4,439,479 | 3/1984 | Kanai et al. | 428/328 |
| 4,461,797 | 7/1984 | Adachi et al. | 428/147 |
| 4,550,049 | 10/1985 | Ono et al. | 428/900 |

FOREIGN PATENT DOCUMENTS

| | | | |
|---|---|---|---|
| 2026344 | 2/1980 | United Kingdom | 428/694 |
| 2026899 | 2/1980 | United Kingdom | 428/694 |
| 2026345 | 2/1980 | United Kingdom | 428/694 |
| 2087302 | 5/1982 | United Kingdom | . |

*Primary Examiner*—Marion C. McCamish
*Assistant Examiner*—William M. Atkinson
*Attorney, Agent, or Firm*—Oblon, Fisher, Spivak, McClelland & Maier

[57] ABSTRACT

A polyester film for magnetic recording media having excellent flatness, slipperiness and adhesiveness of the magnetic layer thereto, said film having minute protrusions on the surface thereof including roughness units each of which consists of a minute protrusion and a recess therearound having a longer diameter of at least 3 $\mu$m, wherein the number of the roughness units per square mm, A, (number/mm$^2$), satisfies the relation (1):

$$5 < A \leq 2500 \qquad (1)$$

and wherein the proportion of the number of the roughness unit to the total number of the protrusions D (%) satisfies the relation (2):

$$0.1 \leq B \leq 50 \qquad (2)$$

and wherein the center line average roughness R$_2$ ($\mu$m) and the number of secondary interference fringes measured by the multiple interference method, H$_2$, (number/mm$^2$), satisfies the relation (3):

$$R_a \geq 2 \times 10^{-4} \cdot H_2 + 0.08 \qquad (3)$$

wherein H$_2$ is not more than 200, and the ratio of the peak value of the [(1 1 0)] face measured by X-ray diffractometry [I(1 1 0)] to the peak value of (1 0 0) face [I(1 0 0)] satisfies the relation (4):

$$I(1\ 1\ 0)/I(1\ 0\ 0) > 0.1 \qquad (4).$$

1 Claim, No Drawings

POLYESTER FILM FOR MAGNETIC RECORDING MEDIA

This application is a continuation, of application Ser. No. 818,920, filed Jan. 15, 1986, now abandoned which is a continuation of abandoned application Ser. No. 599,333, filed 4/12/84.

TECHNICAL FIELD OF THE INVENTION

This invention relates to biaxially oriented polyester films suitable for manufacturing magnetic recording media such as audio or video magnetic tapes, magnetic video disks, floppy disks, etc. More particularly, it relates to polyester films for magnetic recording media provided with excellent flatness, slipperiness, sliding durability, and adhesion of magnetic layers thereto.

BACKGROUND OF THE INVENTION

Biaxially oriented polyester films have excellent mechanical, thermal and electrical properties and chemical resistance, and are used in various fields. Particularly, they are suitably used as base films for magnetic tapes. As the characteristics of the base film for magnetic tapes strongly influence the quality of the manufactured magnetic tape, demand for base films of higher quality has been increasing steadily in recent years along with progress in magnetic tape technology. Base films provided with further improved flatness are wanted in order to improve such electromagnetic characteristics as video S/N, chroma S/N, dropout, generation of envelope, etc. of video magnetic tapes, for instance.

On the other hand, base films which are simultaneously provided with improved slipperiness, durability and surface flatness are desired for improving the appearance of wound tapes and sliding property, as well as wear resistance.

In conventional base films, however, there has been a problem that if the number of minute protrusions formed on the surface of films and the height thereof are increased in order to improve the sliding property and durability of films, the surface flatness is impaired resulting in deterioration in electromagnetic characteristics. In order to overcome this problem, an attempt has been made to provide the film surface with roughness formed by protrusions accompanied by recesses. (Refer to Japanese Laying-Open Patent Publication Nos. 66936/82, 167215/82, 167216/82, 189822/82, and 116173/74.) However, it has been pointed out that these films are inferior in durability in uses where the tapes are subject to repeated sliding under severe hot and humid conditions (Japanese Laying-Open Patent Publication No. 167,216/82).

With the intention of solving the above-mentioned problems, we made an intensive study and found that films provided with excellent sliding property and durability as well as surface flatness can be manufactured if certain conditions are satisfied in the relation between the center line average roughness $R_a$ ($\mu$m) and the number of secondary interference fringes measured by the multiple interference method $H_2$ (number/mm$^2$), and we made this invention.

DISCLOSURE OF THE INVENTION

This invention provides a polyester film for magnetic recording media characterized by having minute protrusions on the surface and satisfying the following numerical formula (1) in the relation between the center line average roughness $R_a$ ($\mu$m) and the number of the secondary interference fringes $H_2$ (number/mm$^2$) measured by the multiple interference method:

$$R_a \geq 2\times 10^{-4}\cdot H_2 + 0.008 \tag{1}$$

wherein $H_2$ is not more than 200.

The polyester employed in the invention of this application is a polyester at least 80% by weight of which comprises ethylene terephthalate units and the remaining less than 20% by weight comprises units of a comonomer or comonomers, or a blend of at least 80% by weight of ethylene terephthalate polyester and less than 20% by weight of another polymer or polymers. The polyester can contain a stabilizer such as phosphoric acid, phosphorous acid or esters thereof; an additives such as titanium dioxide, fine silica or kaoline; or a lubricant.

The minute protrusions referred to in this specification are those formed of inorganic particles added to the polymer, or particles formed from the insoluble residue of the catalyst used for preparation of the polymer, or both of these.

The film of this invention must satisfy the following numerical formula (1) in the relation between the center line average roughness $R_a$ ($\mu$m) and the number of secondary interference fringes $H_2$ (number/mm$^2$) measured by the multiple interference method:

$$R_a \geq 2\times 10^{-4}\cdot H_2 + 0.008 \tag{1}$$

wherein $H_2$ is not more than 200.

It is thought that $H_2$ is closely related to the electromagnetic characteristics, and $R_a$ is closely related to the friction coefficient of a film. When $H_2$ is in excess of 200/mm$^2$, the electromagnetic characteristics are deteriorated, and therefore such films are not suitable as base films for magnetic tapes. For base films for video magnetic tapes, it is preferred that $H_2$ be not more than 150/mm$^2$, and for base films for high quality video magnetic tapes, it is preferred that $H_2$ be not more than 100/mm$^2$. The number of interference fringes of the third order or higher ($H_3$, $H_4$, etc.) is preferably not more than 10/mm$^2$, and most preferably is zero.

On the other hand, $R_a$ must be not less than $2\times 10^{-4}\cdot H_2 + 0.008$. When $R_a$ is less than $2\times 10^{-4}\cdot H_2 + 0.008$, no decrease in the friction coefficient is realized and improvement in the flatness and slipperiness cannot be expected. The preferred range of the $R_a$ value is $2\times 10^{-4}\cdot H_2 + 0.008 \leq R_a \leq 2\times 10^{-4}\cdot H_2 + 0.045$, and a more preferred range thereof is $2\times 10^{-4}\cdot H_2 + 0.011 \leq R_a \leq 2\times 10^{-4}\cdot H_2 + 0.045$. If the $R_a$ value is too high, the electromagnetic characteristics deteriorate even when $H_2$ is small.

Various methods can be employed to obtain films satisfying the above relation between $R_a$ and $H_2$. Particles in films show a certain particle size distribution. If the $H_2$ value, which represents the number of larger particles having bearing on the electromagnetic characteristics, is decreased, the total number of particles will also decrease so long as the distribution remains unchanged. The $R_a$ value will also decrease along with the $H_2$ value. Some special method is required to decrease the $H_2$ value without lowering the $R_a$ value. For instance, when ordinary stretching conditions are employed, inorganic particles of uniform particle size, that is, a batch of particles from which larger particles have been removed, may be added to film materials and be made to exist on the film surface separated from each other. Or otherwise, in the case where inert particles are deposited from insoluble catalyst residue, the particles must be formed from the catalyst residue so that the particles be of uniform size and exist separatedly from each other, whereby larger particles are removed without reducing the total number of the particles and the particle size distribution curve shows a narrow steep peak, by devising a proper polymerization process. However, it is generally more convenient to attain the above-mentioned effect by employing specific conditions in the stretching operation for both added particles and deposited particles.

For instance, when an extruded and quenched raw polyester film containing particles is stretched longitudinally, it is preferred that the degree of longitudinal orientation be controlled so that the index of birefringence $\Delta n$ is $80 \times 10^{-3}$ or less, and thereafter the film is stretched transversely. For base films for magnetic recording media, it is the most fundamental requirement that there be as little fluctuation as possible in thickness of a film and the film contain as few coarse particles as possible on the surface, which are the cause of dropout. Therefore, it is preferred that the value $R/\overline{X}$, which is a quotient of R ($\mu$m), which is the difference of the maximum thickness and the minimum thickness when thickness is measured over 5 meters longitudinally, divided by $\overline{X}$ ($\mu$m), which is the average thickness, is not more than 0.10 at the highest. And it is preferred with respect to coarse particles that the number of interference fringes of the fourth or higher orders of film measured by the two-beam interference method be not more than 100/cm$^2$.

Therefore, it is preferred to carry out the longitudinal stretching in at least two stages at lower temperatures so that the above mentioned relationship between H$_2$ and R$_a$ is satisfied without causing enhancement of the sticking of the films to the hot drawing rolls and deterioration in the longitudinal thickness uniformity of films. When the longitudinal stretching of films is carried out in more than two stages, at least the last stage stretching should be effected at a higher temperature. In order to reduce the number of coarse particles, a filter of smaller mesh should preferably be used at the stage of discharge from the polymerization reactor or of extrusion.

Then the thus longitudinally stretched low oriented film is stretched transversely. And the thus biaxially oriented film is further stretched longitudinally and/or transversely, if desired, and finally the film is heat-set.

As stated above, a film in which the relation $H_2 \leq ®$, $R_a \geq 2 \times 10^{-4} \cdot H_2 + 0.008$, and the fundamental conditions such that thickness fluctuation is low and number of coarse particles is small, etc. are satisfied, can be obtained by various methods. However, there are variations among the products. The number of roughness units each consisting of a minute protrusion on the film surface and a recess extending from said protrusion on both sides generally perpendicular to the longitudinal direction varies from nil to several thousand per square millimeter from product to product.

These roughness units are formed by deformation of the polymer material in the proximity of included particles in the course of stretching. It has been pointed out that flatness and slipperiness of films are poor when the number of these roughness units is small.

In this invention, however, it was found that if the above mentioned relation of $R_a$ and $H_2$ is satisfied, the flatness and slipperiness of films with fewer roughness units are not inferior to those with a larger number of roughness units and may even be superior thereto.

That is to say, it has been revealed that among films which satisfy the relation $H_2 \leq 200$, and $R_a \geq 2 \times 10^{-4} \cdot H_2 + 0.008$, films having up to 2500 roughness units per mm$^2$ which respectively comprise a protrusion and a recess extending therefrom 3 $\mu$m in longer diameter (films in which the number of such units A is $5 < A \leq 2500$) are provided with both excellent flatness and slipperiness and durability.

If the number of the roughness units A is in excess of 2500/mm$^2$, the film becomes inferior in durability. The number A is preferably $5 < A \leq 1500$, more preferably $5 < A \leq 800$. When there are no roughness units, that is when $A = 0$, the film is a little inferior in slipperiness.

In the foregoing, flatness and slipperiness are considered in combination. However, there are cases where the flatness must be considered preferentially and other cases where slipperiness must be considered preferentially. Magnetic tape manufacturers have recently been demanding drastically improved slipperiness without sacrifice of flatness in order to increase productivity. This invention provides films which meet such a demand. As mentioned before, the $R_a$ value is related to the friction coefficient. However, the friction coefficient differs depending on the number of particles and the distribution in height of particles even with the same $R_a$ value. The friction coefficient ($\mu$) of films should preferably satisfy the relation $0.10 \leq \mu \leq 0.39 - 6 \cdot R_a$. Too low $\mu$ values are undesirable since the films will be irregularly wound in winding and rewinding, or cinching will occur. In order to avoid these phenomena, it is insufficient merely to restrict the number of protrusions having recesses therearound. Instead, the ratio B (%) of the number of such protrusion to the total number of protrusions should preferably satisfy the relation $0 < B \leq 50$.

The total number of protrusions referred to in this specification means the sum of the number of protrusions which have no recess therearound and whose diameter at the foot thereof is not less than 2 $\mu$m and the number of protrusions which have recesses therearound per mm$^2$.

When the B value is in excess of 50%, the effect of enhancing slipperiness is not exhibited. If the B value is too large, the area of roughness units which contact a magnetic head or another film decreases, and the part other than the roughness units becomes too flat. Therefore, the contact area as the whole does not decrease but increases and the friction coefficient does not decrease.

When the number of the roughness units is too large, there is a tendency that other particles are buried under the surface of the polymer and the decrease in the friction coefficient is impaired.

The sliding property of the films the B value of which is in excess of 50% largely depend upon the particles of the roughness units. The friction coefficient of such a film after it has been used many times markedly increases. Therefore, the preferred range of the B value is $0.1 \leq B \leq 40$.

Thus base films especially suitable for magnetic recording media provided with excellent flatness, slipperiness, slidability, durability, slidability after repeated use can be provided by arranging for the relations $H_2 \leq 200$, $R_a \geq 2 \times 10^{-4} \cdot H_2 + 0.008$ to be satisfied, the number of roughness units consisting of a protrusion and a recess formed around said protrusion A to be not more than 2500/mm$^2$, for the ratio of the number of said roughness units to the total number of protrusion B to be not more than 50%.

Meanwhile, good adhesion of the magnetic layer to the polyester base film is required in addition to the above requirements in the application of the base film for magnetic tapes. We have found that films in which the ratio of the peak value of the (1 $\bar{1}$ 0) face determined by the X-ray diffraction method to that of the (1 0 0) face is not less than 0.1 provide outstandingly good adhesion to magnetic layers in comparison to ordinary polyester films, in addition to excellent flatness, slipperiness and durability. When the ratio is less than 0.10, no enhancement of adhesion is observed.

It is surmized that the inclination of crystal faces from the film surface permits easy penetration of the solvent of the magnetic coating compositions. Such films can be obtained by controlling the orientation in the longitudinal stretching, or relaxing the stretched film longitudinally or transversely, or heat-setting the stretched film at a higher temperature close to its melting point.

As described above, polyester films, in which certain specific surface conditions are satisfied, and specific relations between the center line average roughness $R_a$ ($\mu$m), the $H_2$ (number/mm$^2$) determined by the multiple interference method, and the peak value of the (1 $\bar{1}$ 0) face determined by the X-ray diffraction method are satisfied, are most suitable for magnetic recording media provided with flatness, slipperiness, especially slidability in repeated use, and adhesion of magnetic layers.

This invention can be applied not only to balanced films (films requiring 9.0–12.0 kg/mm$^2$ for 5% longitudinal and transverse elongation, for instance) but also to longitudinal semitensilized films (which require more than 12.0 kg/mm$^2$ to 14 kg/mm$^2$ for 5% longitudinal elongation), longitudinal tensilized films (which require more than 14 kg/mm$^2$ for 5% longitudinal elongation), transverse semitensilized films (which require more than 12.0 kg/mm$^2$ to 14 kg/mm$^2$ for 5% transverse elongation), and transverse tensilized films (which require more than 14 kg/mm$^2$ for 5% transverse elongation), as well as films having these tensile properties in combination. The process of this invention is especially preferable to apply to longitudinally and transversely semitensilized or tensilized films. Because high strength films are usually obtained by restretching biaxially stretched films, but the surface of such films are further flattened during restretching and thus the slipperiness thereof is impaired and refurnishing of slipperiness is strongly desired for these films.

DETAILED DESCRIPTION OF THE EMBODIMENTS

Now the invention will be illustrated by way of working examples. However, the invention is not restricted thereto within the scope of the claims described hereinafter. The methods employed for measuring various properties of films are as follows:

(1) Friction coefficient ($\mu$)

A strip of film was brought into contact with the surface of a hard chromium-plated roll having a diameter of 6 mm and a surface finish of 2.0S over an arc of 135° ($\theta$), a load ($T_2$) of 53 g was applied to one end thereof, the strip was allowed to slide over the surface of the roll, at the rate of 1 m/min and the supporting force $T_1$ (g) on the other end of the strip was measured. The kinetic friction coefficient $\mu$ was determined in accordance with the following equation:

$$\mu = \frac{1}{\theta} \ln\left(\frac{T_1}{T_2}\right) = 0.424 \ln\left(\frac{T_1}{53}\right)$$

(2) Intrinsic viscosity ([$\eta$])

To 200 mg of a sample, 20 ml of phenol/tetrachloroethane (50:50 by weight) was added and the sample was dissolved by heating at 110° C. The viscosity of the solution was measured at 30° C.

(3) $F_5$ value (tensile force required for 5% elongation)

Specimens $\frac{1}{2}$ inch in width and 50 mm in length (length between chucks) were drawn by a tensile tester, Tensilon UTM-III, marketed by Toyo Measuring Instruments Co., Ltd., at a rate of 50 mm/min in an environment of 20° C. and 65% RH. The measured 5% off-set load was divided by the initial corss-sectional area of the specimen and the value is given in kg/mm$^2$.

(4) Center line average roughness ($R_a$)

Surface roughness was measured using a surface roughness measuring apparatus SE-3FK manufactured by Kosaka Kenkyusho as explained below. The radius of curvature of the tip of the contact needle was 0.5$\mu$ and the needle pressure was 30 mg. Center line average value of surface roughness $R_a$ was determined in accordance with the procedure prescribed in JIS (Japanese Industrial Standards) B0601. The standard length L (2.5 mm of the film) is taken from the film profile curve along the center line. The center line of the portion is taken on an abscissa and the roughness is taken on an ordinate. Then the roughness curve is expressed as y=f(x). The $R_a$ value was obtained as an average of 5 points along the longitudinal line and 5 points along the transverse line. The waves longer than 80 $\mu$m were cut off. $R_a$ is given in $\mu$m as:

$$\frac{1}{L} \int_0^L |f(x)| dx$$

(5) Number of roughness units consisting of a protrusion and a recess therearound A and the ratio thereof B The surface of a film coated with vaporized aluminum was photographed under a Carl Zeiss differential interference microscope at a magnification factor of 750 and the number of protrusions in 1 mm$^2$ area was counted. The term "number of protrusions" means the sum of the number of protrusions without recess therearound at least 2 $\mu$m in diameter at the foot thereof and the number of roughness units consisting of protrusions having a recess around said protrusion at least 3 $\mu$m in the longer diameter A among the protrusions formed by included particles. The ratio B of the number of the roughness units to the total number of protrusions is indicated in %.

(6) Measurement of surface roughness by the multiple interference method

The surface of a film was coated with vaporized aluminum. The coated surface was placed under a surface finish microscope made by Nippon Kogaku K.K. and interference fringes formed at the wavelength of 0.54 $\mu$m were photographed. Number of interference fringes of n-th order was counted and is indicated as the number per mm$^2$ area. The reflectivity of the mirror used was 65% and the magnification (factor) was 200.

(7) X-ray diffractometry

The peak value of the (1 0 0) face near 2$\theta$=26° and the peak value of the (1 $\bar{1}$ 0) face near 2$\theta$=23° of a film sample were read by means of an automatic X-ray diffractometer and the ratio of the two values was taken. X-ray output was 30 KV×15 mA.

(8) Chroma S/N and adhesion of magnetic layer

Chroma S/N was measured by a Shibasoku's NTSC type video noise determinator Q25R using a commercially available home VTR. A magnetic tape made of a conventional base film which has no protrusions having recesses around them was used as a reference and its noise was taken as 0 dB. Meanwhile, adhesion measured as follows The coated surface of a magnetic tape was bonded to the surface of a stainless steel plate by means of a double-coated adhesive tape. The film was peeled off at an angle of 180° and the tensile force in peeling was taken as the index of adhesion strength. The adhesion strength of the reference tape was taken as unity (1.0).

The magnetic coating was prepared as follows.

A magnetic powder coating composition indicated below was applied on the surface of a cleaned pretreated film by a gravure roll and was smoothed with a doctor knife so as to form a magnetic layer about 6 μm in thickness. Before the coating was completely dried the magnetic layer was magnetically oriented and the dried film was cured at 80° C. for 20 hours, and thereafter calendered. The thus prepared magnetic film was slitted into tapes ½ inch in width.

| Ingredients | Parts by wt. |
|---|---|
| Ferromagnetic powder principally comprised of γ-Fe$_2$O$_3$ | 250 |
| Polyurethane resin | 50 |
| Vinyl chloride-vinyl acetate copolymer | 30 |
| Nitrocellulose | 20 |
| Lecithin | 3 |
| Carbon black | 15 |
| MEK | 900 |
| Polyisocyanate compound | 15 |

COMPARATIVE EXAMPLES 1 AND 2

(Preparation of polyester)

One hundred (100) parts by weight dimethyl terephthalate, 70 parts by weight ethyleneglycol, 0.10 part by weight calcium monohydrate and 0.17 part by weight lithium acetate dihydrate were placed in a reactor and heated. As the temperature rose, ester interchange proceeded and methanol was distilled away. After about hours, the temperature reached 230° C. and the ester interchange reaction was substantially completed. Triethyl phosphate (0.35 part by weight) was added to the reaction product, and 0.05 part by weight antimony trioxide was further added as a condensation polymerization catalyst. Thus the reaction product was polymerized into a polyester by the conventional process. A number of uniformly dispersed deposited fine particles 0.5–1 μm in particle size including particles containing calcium and lithium and elemental phosphorus were observed in the polyester. The intrinsic viscosity [η] of this polyester was 0.65. A polyester without these particles was prepared separately and was mixed with the above-described polyester at a ratio of 1:1 by weight, and the mixture was used for making films, too.

(Film making)

A raw film ([η]=0.62), which was prepared by melt-extrusion and quenching by the electrostatic pinning method, was stretched longitudinally by a factor of 3.7 at 90° C., then transversely by a factor of 3.5 at 110° C. and finally was heat-set at 220° C. Thus a biaxially oriented film 15 μm in thickness was obtained (Comparative Example 1). Meanwhile, another portion of the biaxially stretched film was heat-set at 150° C. instead of at 220° C., and the resulting film was further longitudinally stretched by a factor of 1.1 at 130° C. and was heat-set at 220° C. Thus another biaxially oriented film 15 μm in thickness was obtained (Comparative Example 2).

Various properties of the obtained films are indicated in Table 1 together with those of the films of the Examples described below.

EXAMPLES 1–4

The same raw film as used in Comparative Example 1 was first stretched longitudinally by a factor of 2.4 at 85° C. and further stretched longitudinally by a factor of 1.2 at 110° C. by means of drawing roll pairs rotating at different rotation speeds and, the thus longitudinally stretched film was stretched transversely by factor of 3.5 at 140° C. using a tenter and finally was heat-set at 220° C. Thus a biaxially oriented film 15 μm in thickness was obtained (Example 1).

Instead of being heat-set at 220° C., the film was heat-set at 150° C. and was further longitudinally stretched at 130° C. by a factor of 1.2 (Example 2), 1.4 (Example 3) and 1.5 (Example 4) and were then heat-set at 220° C. to obtain films 15 μm in thickness.

EXAMPLES 5 AND 6

The same raw film as used in Comparative Example 1 was stretched longitudinally by factor of 2.4 at 85° C. in the same way as in Example 1, that is, by using roll pairs rotating at different rotation speeds, and was further stretched in the same direction by a factor of 1.25 (Example 5) and 1.3 (Example 6) at 110° C., and the longitudinally stretched films were then stretched transversely by a factor of 3.5 at 140° C. by means of a tenter and finally were heat-set at 220° C. so as to give finished films 15 μm in thickness.

EXAMPLE 7

The same raw film as used in Comparative Example 1 was stretched longitudinally by a factor of 2.2 at 85° C. by using roll pairs rotating at different rotation speeds, and further stretched in the same direction by a factor of 1.3 at 110° C., and thereafter the film was stretched transversely by factor of 3.5 at 140° C. by means of a tenter and finally heat-set at 220° C. A 15 μm thick biaxially oriented film was obtained.

EXAMPLE 8

The same raw film as used in Comparative Example 1 was stretched by a factor of 2.7 at 85° C. using roll pairs rotating at different rotation speeds and further stretched in the same direction by factor of 1.2 at 110° C., then was stretched transversely by a factor of 3.5 at 140° C., and finally was heat-set at 220° C. A 15 μm thick film was obtained.

Properties of the obtained films are summarized in Table 1.

TABLE 1

| | $R_a$ ($\mu$m) | $H_2$ (number/mm²) | A (number/mm²) | B (%) | $F_5$ Longitudinal (kg/mm²) | $\mu_1$ | $\mu_{200}$ | $\frac{I(1\bar{1}0)}{I(100)}$ | Chroma S/N (dB) | Relative Adhesion Strength |
|---|---|---|---|---|---|---|---|---|---|---|
| Comparative Example 1 | 0.021 | 100 | 0 | 0 | 10.7 | 0.32 | 0.35 | 0.05 | 0 | 1.0 |
| Comparative Example 2 | 0.020 | 80 | 0 | 0 | 14.0 | 0.34 | 0.37 | 0.07 | 0 | 0.9 |
| Example 1 | 0.015 | 15 | 900 | 15 | 11.3 | 0.26 | 0.30 | 0.21 | +1.2 | 2.2 |
| Example 2 | 0.014 | 12 | 800 | 13 | 13.0 | 0.26 | 0.32 | 0.20 | +1.2 | 2.0 |
| Example 3 | 0.013 | 10 | 850 | 16 | 14.2 | 0.27 | 0.32 | 0.18 | +1.4 | 1.9 |
| Example 4 | 0.013 | 9 | 900 | 14 | 17.0 | 0.28 | 0.34 | 0.16 | +1.4 | 1.8 |
| Example 5 | 0.016 | 20 | 300 | 5 | 11.5 | 0.25 | 0.29 | 0.20 | +1.0 | 2.0 |
| Example 6 | 0.017 | 30 | 10 | 0.15 | 11.8 | 0.22 | 0.26 | 0.18 | +0.8 | 2.1 |
| Example 7 | 0.014 | 10 | 1400 | 30 | 10.5 | 0.27 | 0.32 | 0.22 | +1.8 | 2.3 |
| Example 8 | 0.019 | 40 | 0 | 0 | 11.5 | 0.30 | 0.34 | 0.16 | +0.4 | 1.6 |

As seen in Table 1, films in which the relation $R_a \geq 2 \times 10^{-4} \cdot H_2 + 0.008$ is not satisfied, are inferior in flatness and slipperiness.

We claim:

1. A polyester film for magnetic recording media having excellent flatness, slipperiness and ability to retain a magnetic layer applied thereto, said film having minute protrusions on the surface thereof including roughness units each of which consists of a minute protrusion and a recess therearound having a longer diameter of at least 3 $\mu$m, wherein the number of said roughness units per square mm, A, (number/1 mm²), satisfies the relation (1):

$$10 < A \leq 1400 \tag{1};$$

the proportion of the number of the roughness units to the total number of the protrusions B (%) satisfies the relation (2):

$$5 \leq B \leq 30 \tag{2};$$

the center line average roughness $R_a$ ($\mu$m) ranges from 0.013 to 0.019 and the number of secondary interference fringes, $H_2$ (number/1 mm²), measured by the multiple interference method ranges from 9 to 40; the ratio of the peak value of the (1 $\bar{1}$ 0) face measured by X-ray diffractometry to the peak value of the (1 0 0) face satisfies the relation (4):

$$0.10 \leq I(1\bar{1}0)/I(1\,0\,0) \leq 0.21 \tag{4};$$

and the difference between the maximum thickness and the minimum thickness R ($\mu$m) and the average thickness of the film $\bar{x}$ ($\mu$m) satisfies the relation (5);

$$R/\bar{x} < 0.10 \tag{5}.$$

* * * * *